United States Patent [19]
Kowatch

[11] 3,814,157
[45] June 4, 1974

[54] NON-PNEUMATIC VEHICLE WHEEL

[76] Inventor: Edward J. Kowatch, 3405 Birch Ave., Allentown, Pa. 18103

[22] Filed: Jan. 20, 1972

[21] Appl. No.: 203,116

[30] Foreign Application Priority Data
Dec. 16, 1971 Philippines............................. 6363

[52] U.S. Cl..................... 152/17, 152/92, 152/261, 152/285
[51] Int. Cl.............................................. B60b 9/06
[58] Field of Search......... 152/13, 17, 92, 261, 284, 152/285, 287

[56] References Cited
UNITED STATES PATENTS
1,146,289   7/1915   Shook................................ 152/261
1,148,072   7/1915   Black................................. 152/261
1,171,507   2/1916   De Loe.............................. 152/261
1,213,557   1/1917   Trotter.............................. 152/261
2,364,874   12/1944  Saldin............................... 152/261

Primary Examiner—Drayton E. Hoffman

[57] ABSTRACT

A non-pneumatic vehicle wheel utilizing a conventional pneumatic wheel rim, a continuous helical spring annulus and a pneumatic tire casing. The helical spring is secured around the wheel rim and the casing overlies the outer peripheral portion of the helical spring and serves as the ground engaging element of the wheel.

1 Claim, 6 Drawing Figures

NON-PNEUMATIC VEHICLE WHEEL

This invention relates to a non-pneumatic vehicle wheel utilizing a helical spring annulus.

In times of war and similar exigencies, it is sometimes necessary to provide a substitute for pneumatic wheels which are puncture-proof but which have the desirable performance characteristics of penumatic wheels. Prior vehicle wheel substitutes of this type have not found commercial acceptance due to their inherently profound disadvantages such as lack of uniform resiliency and in most cases no provision is made for effecting repairs without substantially completely replacing the entire unit. The above and other disadvantages of said prior wheel substitutes result in a performance that is less than satisfactory and a useful life less than that of pneumatic wheels.

Accordingly, the objects of the invention are:

1. To provide an improved non-pneumatic, puncture-proof vehicle wheel which is rugged in construction and so well designed as to be unlikely to break down, and hence highly efficient in operation;
2. To provide a non-pneumatic vehicle wheel which may be conveniently repaired;
3. To provide a non-pneumatic vehicle wheel whose casing and ground-engaging element is an easily replaceable pneumatic tire;
4. To provide a non-pneumatic vehicle wheel utilizing a conventional pneumatic wheel rim;
5. To provide a non-pneumatic vehicle wheel having the resilience of a pneumatic wheel and simulative of the appearance of the same.

Essentially, the vehicle wheel of the invention comprises a conventional pneumatic wheel rim, a continuous helical spring annulus and a pneumatic tire casing. The novel arrangement of these elements and their constructional inter-relationships by which the aforementioned objects are obtained will now be described and shown in detail.

In the drawings.

The same reference characters are used to indicate like parts throughout the several views of the drawings.

Figure 1:
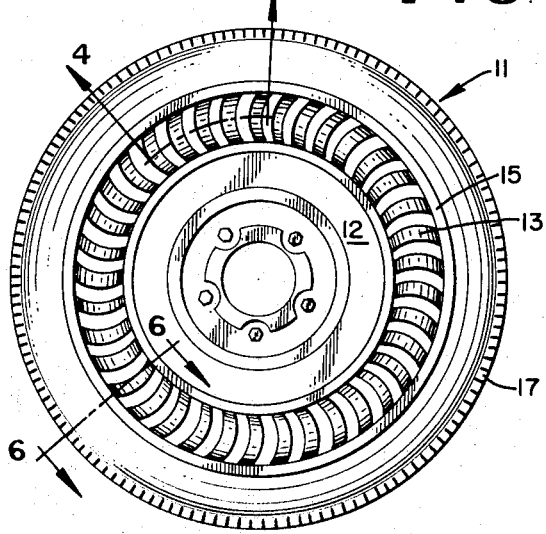
FIG. 1 is a side elevation of the vehicle wheel of the present invention.
Figure 2:
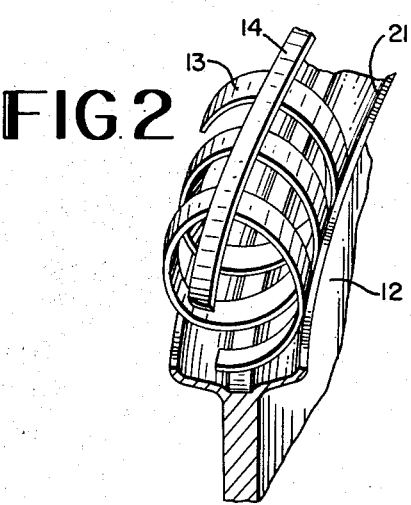
FIG. 2 is a fragmentary perspective detail view of the helical spring annulus shown in relative position of connection with the vehicle rim.

Referring now to the drawings, the vehicle wheel 11 of the invention more specifically includes a conventional pneumatic wheel rim 12 around which is secured by electric welds a continuous annular helical spring 13 defining a toroid extending about said rim 12. The outer peripheral portion of the helical spring 13 is similarly welded to a flexible peripheral flat metal band 14. To further rigidly hold the helical spring in place, an annular metal channel 15 is welded to both sides of the helical spring whose channel recess serves to retain the bead 16 of the casing 17 in fixed position. The casing overlies the outer peripheral portion of the helical spring and serves as the ground-engaging element of the wheel.

The metal components of the wheel, namely, the helical spring, the peripheral metal hand and the annular channels are made of steel of the type which provides equal restoring force for equal amounts of compression or expansion. The above-described novel arrangement of parts has been found to produce a more uniform resiliency regardless of the rotational direction of the wheel due mainly to the flexibility of the peripheral metal band which minimizes road shock and the positioning of the annular channels which prevent twisting of the coils of the helical spring when subjected to load enabling the transmission of load forces along a substantially radial direction.

Figure 3:
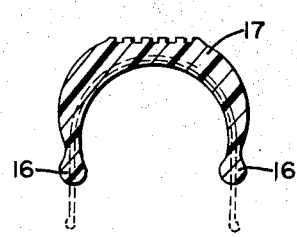
FIG. 3 is a cross-sectional view of the casing, the dotted lines defining a conventional pneumatic tire for purposes of comparison.
Figure 4:
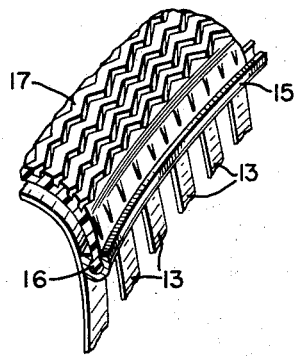
FIG. 4 is a partial perspective taken along line I—I of FIG. 1.
Figure 5:
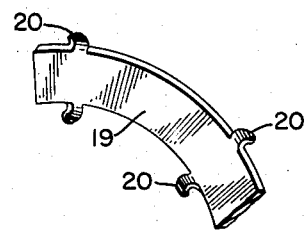
FIG. 5 is a fragmentary perspective view of the annular sidewall covering.

The annular channels being positioned substantially midway the height of the toroid defined by the helical spring annulus necessitate the use of a casing having a height shorter than that of a conventional pneumatic tire, as illustrated in FIG. 3. For emergency use, the casing employed in the subject vehicle wheel may be cut out from a conventional pneumatic tire.

Figure 6:
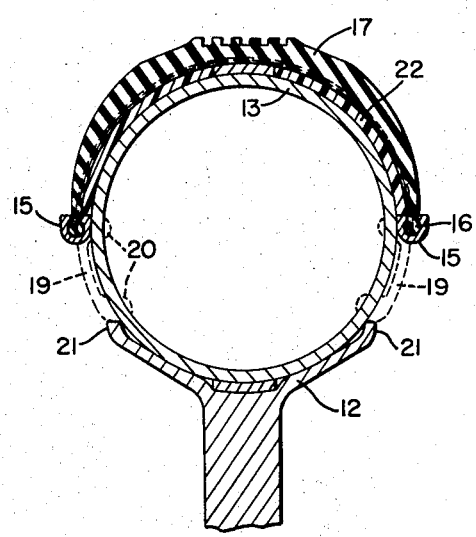
FIG. 6 is a partial vertical cross-section of the wheel taken along line X—X of FIG. 1.

The annular metal channels 15 and the outwardly extending rim flanges 21 co-extensively define an annular opening 18 on both sides of the wheel providing accesses for repair. To prevent ingress of dirt and the like into said openings 18, a detachable annular sidewall covering 19 is provided, having a plurality of circumferentially spaced pairs of locking projections 20 integrally formed on the inner face thereof which are adapted to interlock with the inner sides of the said annular metal channels and the rim flanges, as more clearly illustrated in dotted lines in FIG. 6. When attached, the covering 19 merges with the casing improving the appearance of integrality with the same, thereby simulating a conventional pneumatic wheel.

A suitable resilient filter 22 filling the gap between the annular helical spring and the casing is provided to insure a firm contact between said casing and said helical spring.

The invention may be embodied in other specific forms departing from the essential characteristics thereof. The embodiment shown should not be considered restrictive but merely illustrative, the scope of the invention being defined by the appended claims rather than the foregoing description and all changes which come within the meaning and range of equivalency of the claims are therefore intended to be embraced therein.

What is claimed and desired to be protected by a Letters Patent is:

1. A non-pneumatic vehicle wheel comprising a rim having outwardly extending flanges at its sides, a continuous annular helical spring secured around said rim defining a torid extending about said rim, a flexible peripheral metal band welded to the outer peripheral portion of said annular helical spring, a beaded casing extending about the outer peripheral portion of said helical spring and overlying the same, a pair of annular metal channels welded to the sides of the helical spring and adapted to retain the beads of the casing in fixed position, said rim flanges and said annular metal channels co-extensively defining annular openings providing accesses for repairs and annular sidewall coverings for said openings having a plurality of circumferentially spaced pairs of locking projections integrally formed on the inner face thereof; said locking projections being adapted to interlock with the inner sides of the annular metal channels and the outwardly extending rim flanges.

* * * * *